US007997711B2

(12) United States Patent
Rodriguez et al.

(10) Patent No.: US 7,997,711 B2
(45) **Date of Patent: *Aug. 16, 2011**

(54) SUPPLY UNITS HAVING AN ASSOCIATED ELECTRONICALLY-READABLE MEMORY DEVICE

(75) Inventors: Alberto Rodriguez, Webster, NY (US); Heiko Rommelmann, Penfield, NY (US); William H. Phipps, Fairport, NY (US); Scott J. Bell, Rochester, NY (US); Jerry Money, Charleston, SC (US); Ronald P. Boucher, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 834 days.

This patent is subject to a terminal disclaimer.

(21) Appl. No.: 11/607,165

(22) Filed: Nov. 30, 2006
(Under 37 CFR 1.47)

(65) Prior Publication Data

US 2007/0146452 A1 Jun. 28, 2007

Related U.S. Application Data

(60) Provisional application No. 60/753,712, filed on Dec. 23, 2005.

(51) Int. Cl.
*G01D 11/00* (2006.01)

(52) U.S. Cl. .............................. 347/99; 347/88; 347/103

(58) Field of Classification Search .................... 347/88, 347/99, 103

See application file for complete search history.

(56) References Cited

U.S. PATENT DOCUMENTS

| | | | | |
|---|---|---|---|---|
| 5,455,604 | A | 10/1995 | Adams et al. | 346/138 |
| 5,585,899 | A | 12/1996 | Palumbo et al. | 355/246 |
| 5,636,032 | A | 6/1997 | Springett | 358/296 |
| 5,734,402 | A | 3/1998 | Rousseau et al. | 347/88 |
| 5,805,191 | A | 9/1998 | Jones et al. | 347/103 |
| 5,861,903 | A | 1/1999 | Crawford et al. | 347/88 |
| 6,016,409 | A | 1/2000 | Beard et al. | 399/33 |
| 2007/0080804 | A1* | 4/2007 | Hirahara et al. | 340/572.1 |
| 2007/0146138 | A1* | 6/2007 | Phipps et al. | 340/572.7 |

* cited by examiner

*Primary Examiner* — Manish S Shah
(74) *Attorney, Agent, or Firm* — Wiggin and Dana LLP

(57) ABSTRACT

A machine, such as a phase change or solid ink printing apparatus, has at least one multiple supply unit in the form of an ink stick disposed therein. The ink stick has an electronically-readable memory device associated therewith, and the memory device has stored therein electronic data related to the ink stick and readable by the machine. The memory device may be attached to the ink stick and removed before the ink stick is used for printing in the machine. In another aspect, the memory device is attached to a container for the ink stick. The container may be a cartridge for use in the machine, or a container for packaging the ink stick. The machine may include a coupler configured to read electronic data from the memory device while the memory device is positioned external to the printing apparatus, thus allowing the machine to verify the suitability of the ink stick before it is installed in the machine.

18 Claims, 9 Drawing Sheets

SUPPLY UNITS HAVING AN ASSOCIATED ELECTRONICALLY-READABLE MEMORY DEVICE

CROSS-REFERENCE TO RELATED APPLICATIONS

This application claims the benefit of U.S. Provisional Application No. 60/753,712, filed Dec. 23, 2005, which is incorporated by reference herein in its entirety.

BACKGROUND

Certain types of machines employ multiple supply units that are individually used or consumed and must be periodically replaced during operation of the machine. One such machine is a printing apparatus that uses multiple toner or liquid-ink containers that are used up in sequence. Such a printing apparatus is disclosed, for example, in U.S. Pat. No. 5,585,899 for "Multicontainer Toner Dispensing Apparatus," issued Dec. 17, 1996 to Palumbo et al wherein a xerographic printer with multiple developer (toner) bottles, all the same color, feed into the same color portion of the printer. In operation, the user is able to replace one bottle while another bottle in the same set is emptying out during printing.

Another type of printing machine receives marking material in a form known as an ink stick. The ink stick is a solid or semi-solid structure formed from the marking material, wherein the structure is wholly or partially consumed in the printing process. Unlike powdered or liquid marking materials, ink sticks can be handled and installed without a bottle, cartridge, or other container. Ink sticks may be of any convenient shape (e.g., a pellet, block, brick, cube, or any other geometric structure) for handling and loading into the printing apparatus.

For example, one printing apparatus that uses ink sticks is known as a phase change or solid ink printer. In phase change printers, a feed mechanism delivers the ink stick to a heater assembly, where the ink is melted into a liquid state for depositing onto a receiving medium. U.S. Pat. No. 5,734,402 for an "Ink Feed System", issued Mar. 31, 1998 to Rousseau et al.; and U.S. Pat. No. 5,861,903 for an "Ink Feed System", issued Jan. 19, 1999 to Crawford et al., which are incorporated by reference herein in their entirety, describe exemplary systems for delivering ink sticks into a phase change printer.

Ink sticks hold their shape and, therefore, may be handled and loaded into the printing apparatus without the need for a container or cartridge, as is typically required for liquid ink or powdered toner. Furthermore, the entire ink stick may be melted and consumed, with no need to dispose of, or recycle, any container. Eliminating the need for a container provides many advantages to the use of ink sticks. However, without the use of a container, there are no mechanisms for authenticating or otherwise identifying the ink stick.

A common trend in the office equipment industry is to provide expendable supply units (e.g., copier and printer toner bottles, cartridges, and the like), also known as customer replaceable units (CRUs) or modules, with electronically-readable memory devices, also known as customer replaceable unit monitors (CRUMs), which, when the module is installed in the machine, enable the machine to both read information from the CRUM and also write information to the CRUM. The information read from, or written to, the CRUM may be used by the machine to perform various functions, such as verifying the authenticity of the module, providing operational set points to the machine, and others. For example, U.S. Pat. No. 6,016,409 entitled "System For Managing User Modules in a Digital Printing Apparatus", which is incorporated by reference herein in its entirety, describes various data that may be stored in a CRUM and various functions that may be performed using this data.

BRIEF SUMMARY

In one aspect, there is provided an ink stick for use in a machine, such as a printing apparatus. The ink stick has associated therewith an electronically-readable memory device having stored therein data related to the ink stick.

In another aspect, there is provided a container for at least one ink stick. The container includes an electronically-readable memory device associated therewith, and the memory device has stored therein electronic data related to the ink stick and readable by a machine that uses the ink stick.

In yet another aspect, there is provided a method of packaging an ink stick suitable for use in a machine, the method comprising disposing the ink stick in a container, the ink stick having associated therewith an electronically-readable memory device, the memory device having stored therein electronic data related to the ink stick and readable by the machine.

In yet another aspect, there is provided a multiple supply unit for use in a machine, such as a printing apparatus, comprising a plurality of modules containing a printing material such as a developer or toner or liquid-ink, all of the same type or color, packaged in a single container, the modules being fed into and used sequentially during operation of the machine. The container has an electronically-readable memory device associated therewith, and the memory device has stored therein electronic data related to the modules and readable by the machine.

In yet another aspect, there is provided a printing apparatus comprising a coupler configured to read electronic data from a memory device while the memory device is positioned external to the printing apparatus, wherein the memory device is associated with marking material for the printing apparatus.

In a still further aspect, there is provided a printing apparatus comprising printing hardware suitable for placing marks on a print sheet of a single type or color, including at least two supply units containing a quantity of marking material and having a memory device associated therewith along with a coupler capable of communicating with the memory device of each supply unit. A feed system is further provided which enables the supply units to dispense the marking material to the printing hardware at the same time so that while one supply unit is nearly spent, the other supply unit can continue dispensing marking material, permitting continuous operation of the printing apparatus.

BRIEF DESCRIPTION OF THE DRAWING

Referring now to the figures, which are exemplary embodiments, wherein like items are numbered alike.

DETAILED DESCRIPTION

Figure 1:
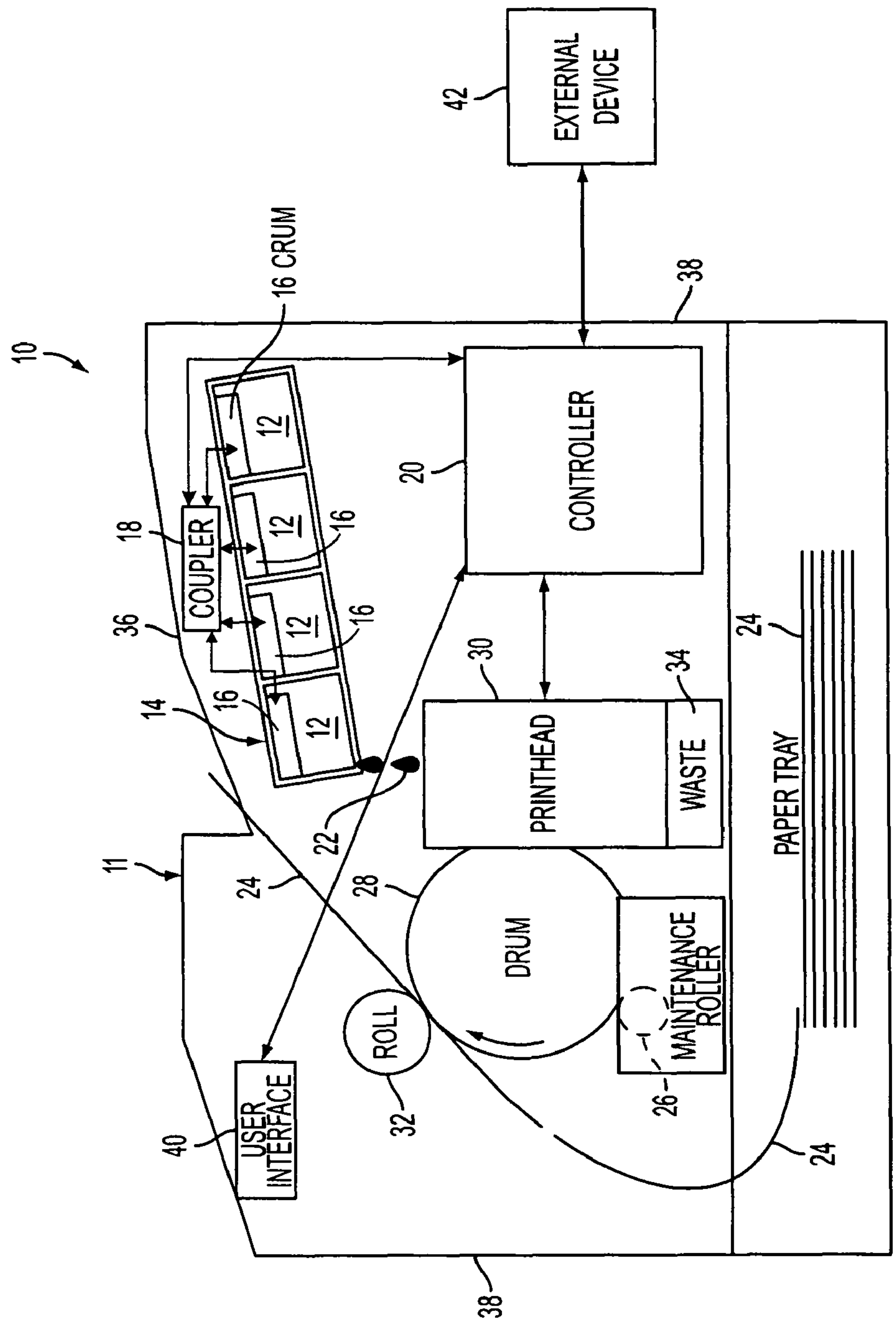
FIG. 1 is a schematic elevational view of a printing apparatus including ink sticks, at least one of which includes an electronically-readable memory device attached thereto.

FIG. 1 schematically depicts a printing machine 10 including multiple supply units in the form of ink sticks 12. The ink sticks are loaded in a solid ink feed system 14 of the machine, wherein at least one of the ink sticks 12 includes an electronically-readable memory device 16, also known as a customer replaceable unit monitor or CRUM, attached thereto. The CRUM 16 retains data relevant to the identification, function, and performance of the respective ink stick 12. Because it includes a non-volatile memory, the CRUM 16 can act as a "scratch pad" for retaining the data stored therein, which travels with the ink stick 12, even when the ink stick 12 is not installed in the machine 10.

The machine 10 further includes a coupler 18, for communicating electronic data between a CRUM 16 and a controller 20. As will be described in further detail hereinafter, this data may include identification data, anti-arbitrage variables, usage data, maximum use values, and performance data related to the ink stick 12, and the coupler 18 and CRUM 16 may employ various means for communicating this data. Using this data, the machine 10 may determine if the ink stick 12 is suitable for use in the machine 10 and, if the ink stick 12 is determined to be unsuitable, prevent installation and/or use of the ink stick 12 in the machine 10.

As used herein, a "coupler" is any physical component of the machine 10 that includes circuitry for communicating data to and/or from one or more CRUMs 16. For example, the coupler 18 may include a printed circuit board, a housing, a platform, or the like, which supports microprocessors, application-specific integrated circuits (ASICS), electronic circuitry, or the like, through which data are communicated to and/or from the CRUM 16. As will be discussed hereinafter, the coupler 18 may include components of a radio frequency identification (RFID) reader (also known as an interrogator or transceiver). While shown as separate components, it is contemplated that the controller 20 and the coupler 18 may be a single component (e.g., a single printed circuit board).

"As used herein, a "supply unit" includes any printing product including, but not limited to, toner or liquid-ink cartridges, ink sticks and the like, for use in a printing apparatus."

As used herein, an "ink stick" includes any solid or semi-solid (e.g., gel) structure formed from a marking material for use in a printing apparatus, wherein the structure is wholly or partially consumed in the printing process. Unlike powdered or liquid marking materials, the ink sticks can be handled and installed without a bottle, cartridge, or other container. The ink stick may be of any convenient shape (e.g., a pellet, block, brick, cube, or any other geometric structure).

In FIG. 1, the machine 10 is depicted as a printing apparatus 10, and more particularly as a phase change printing apparatus, wherein the ink sticks 12 are melted into a liquid state 22 for depositing onto a receiving medium 24 (e.g., paper, transparencies, plastic, or any other material). It is contemplated, however, that the machine 10 may be any machine in which ink sticks 12 are installed.

In the phase change printing apparatus of FIG. 1, the printing process begins with a maintenance roller 26 applying a microscopic layer of silicone oil to a heated drum 28 to facilitate ink release from the drum 28. Melted ink 22 from the feed system 14 flows into an ink reservoir in a printhead 30. Next, the printhead 30 applies the ink onto the rotating drum 28. A receiving medium 24 is fed between the drum 28 and a transfix roller 32, transferring the ink to the receiving medium 24. The ink on the receiving medium 24 cools and solidifies, forming a permanent bond to the receiving medium 24. Waste ink from the printhead 30 is collected in a waste container 34, which may be cleaned or replaced by the user. The operation of the printing apparatus is further described in U.S. Pat. No. 5,805,191, entitled "Surface Application System", to Jones et al, and U.S. Pat. No. 5,455,604, entitled "Ink Jet Printer Architecture and Method", to Adams et al, which are incorporated by reference herein in their entirety.

The machine 10 includes an outer housing 11 having a top surface 36 and side surfaces 38. A user interface 40, such as a front panel display screen, displays information concerning the status of the machine 10, and user instructions. The user interface 40 may also include buttons or other control elements (not shown) for controlling operation of the machine 10. The user interface 40 communicates electronic data with the controller 20, which generally controls the operation of the machine 10. In addition, controller 20 may communicate through a network connection, such as over phone lines or the Internet, to a device 42 external to the machine 10. The controller 20 may include one or more microprocessors, application-specific integrated circuits (ASICs), or other signal processing devices encoded with instructions to operate the machine 10.

Figure 2:
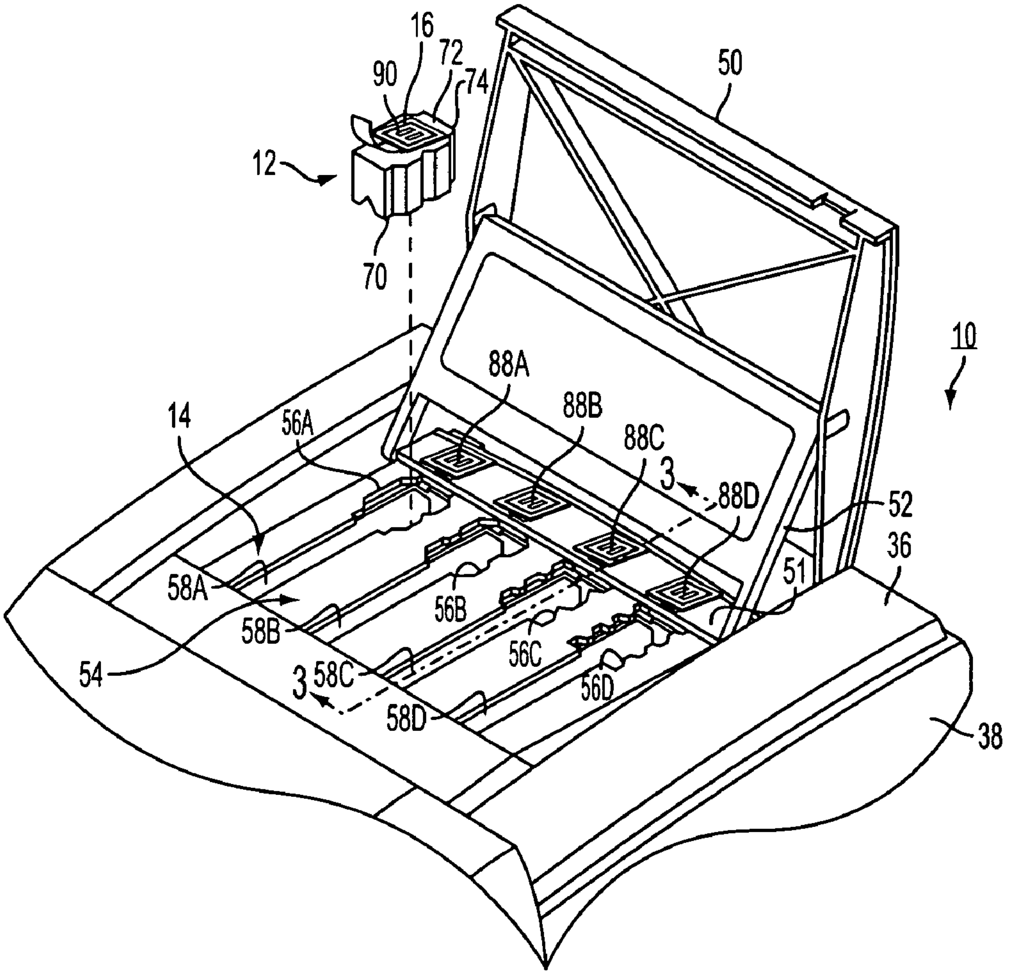
FIG. 2 is an enlarged partial top perspective view of the printing apparatus with an ink access cover open, showing an ink stick in position to be loaded into a feed channel.

Referring to FIG. 2, the top surface 36 of the housing includes a hinged ink access cover 50 that opens to provide the user access to the solid ink feed system 14. In the particular example shown, the ink access cover 50 is attached to a sliding cover 51 by an ink load linkage element 52 so that when the ink access cover 50 is raised, the ink load linkage 52 pivots and slides the sliding cover 51 to an ink load position. When the ink access cover 50 is lowered, the ink load linkage 52 pivots and slides the sliding cover 51 over the ink sticks 12 to a closed position. The interaction of the ink access cover 50 and the ink load linkage 52 may be as described in U.S. Pat. No. 5,861,903 for an "Ink Feed System", issued Jan. 19, 1999 to Crawford et al. As seen in FIG. 2, opening the ink access cover 50 reveals a key plate 54 having keyed openings 56A-D. Each keyed opening 56A, 56B, 56C, 56D provides access to an insertion end of one of several individual longitudinal feed channels 58A, 58B, 58C, 58D of the solid or semi-solid ink feed system 14.

Figure 3:
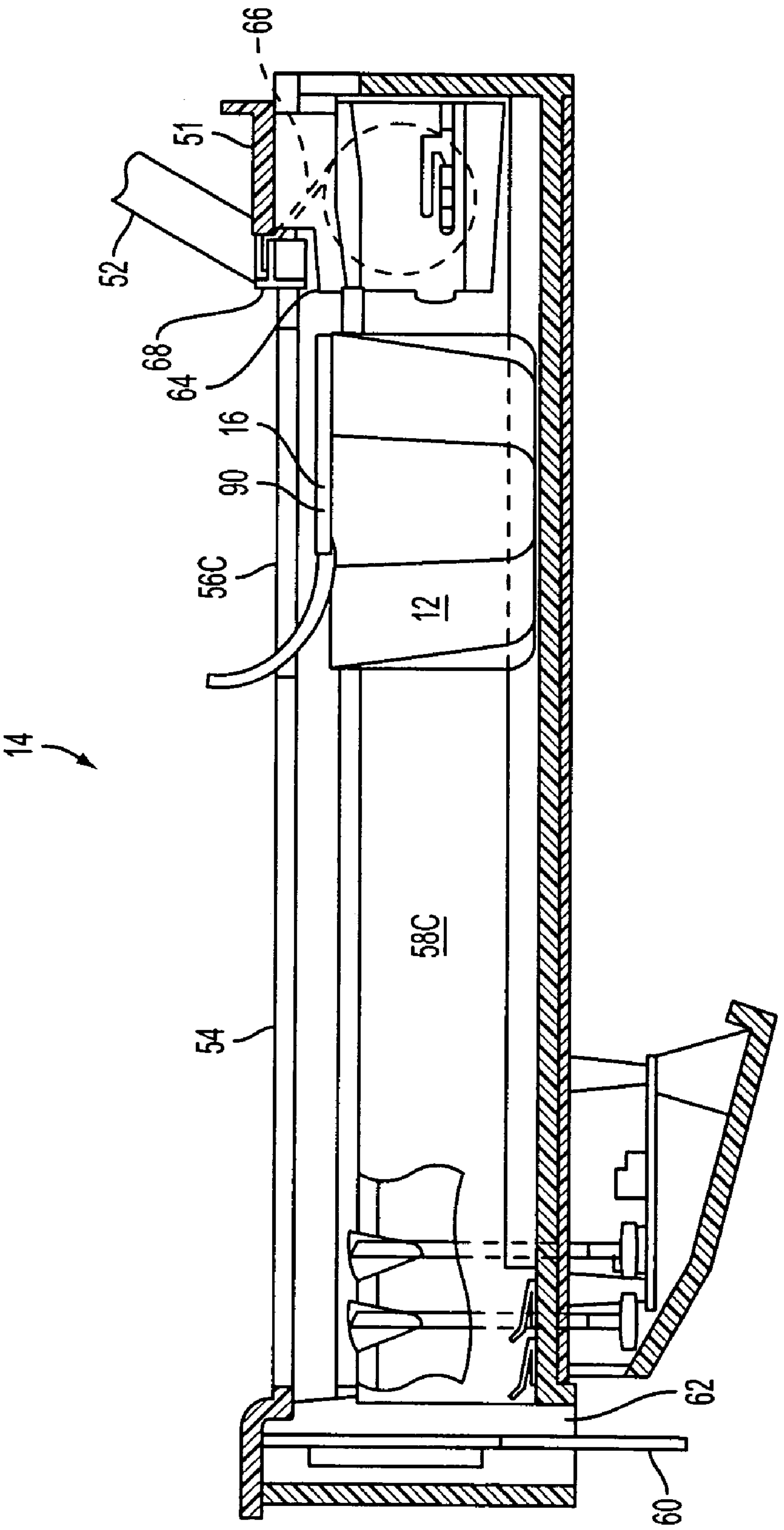
FIG. 3 is a side sectional view of a feed channel of a ink feed system taken along line 3-3 of FIG. 2.

Referring to FIGS. 2 and 3, each longitudinal feed channel 58A-D delivers ink sticks 12 of one particular color to a corresponding melt plate 60. Each feed channel 58 has a longitudinal feed direction from the insertion end of the feed channel 58 to the melt end of the feed channel 58. The melt end of the feed channel 58 is adjacent the melt plate 60. The melt plate 60 melts the ink stick 12 into a liquid form as at 22. The melted ink drips through a gap 62 between the melt end of the feed channel 58 and the melt plate 60, and into the liquid ink reservoir in the printhead 30 (FIG. 1). The feed channels 58A-D have a longitudinal dimension from the insertion end to the melt end, and a lateral dimension, substantially perpendicular to the longitudinal dimension. Each feed channel 58 in the particular embodiment illustrated may include a push block 64, which may be driven by a driving force or element, such as a constant force spring 66, to push the individual ink sticks 12 along the length of the longitudinal feed channel 58 toward the melt plate 60. The tension of the constant force spring 66 drives the push block 64 toward the melt end of the feed channel. As described in U.S. Pat. No. 5,861,903, the ink load linkage 52 is coupled to a yoke 68, which is attached to the constant force spring 66 mounted in the push block 64. The attachment to the ink load linkage 52 pulls the push block 64 toward the insertion end of the feed channel 58 when the ink access cover 50 (FIG. 2) is raised to reveal the key plate 54. In lieu of the push block 64 and spring 66, the feed system 14 may rely on gravity to move the ink sticks 12 to the melt plate 60.

Referring again to FIG. 2, a color printer typically uses four colors of ink (yellow, cyan, magenta, and black). Ink sticks 12 of each color are delivered through a corresponding individual one of the feed channels 58A-D. The operator of the printer exercises care to avoid inserting ink sticks 12 of one color into a feed channel 58 for a different color. Ink sticks 12 may be so saturated with color dye that it may be difficult for a printer user to tell by color alone which color is which. Cyan, magenta, and black ink sticks in particular can be difficult to distinguish visually based on color appearance. The key plate 54 has keyed openings 56A, 56B, 56C, 56D to aid the printer user in ensuring that only ink sticks 12 of the proper color are inserted into each feed channel 58. Each keyed opening 56A, 56B, 56C, 56D of the key plate 54 has a different and unique shape. The ink sticks 12 of the color for that feed channel 58A-D have a shape corresponding to the shape of the respective keyed opening 56A-D. The keyed openings and corresponding ink stick shapes exclude from each ink feed channel ink sticks of all colors except the ink sticks of the proper color for that feed channel.

FIG. 2 depicts an exemplary ink stick 12, which is formed of an ink stick body having a bottom, represented by a general bottom surface 70, a top, represented by a general top surface 72, and at least two lateral extremities or sides, represented by general side surfaces 74. As noted above, the side surfaces 74 may also be shaped with the key shapes to match the keyed openings 56 through the key plate 54. It will be appreciated, however, that the ink stick 12 may be of any convenient geometric shape. The ink stick 12 may be formed by pour molding, compression molding, or other formation techniques, and the marking material used to form the ink stick 12 may be any marking material for use in a printing apparatus. Attached to the ink stick 12 is the CRUM 16.

Figure 4:
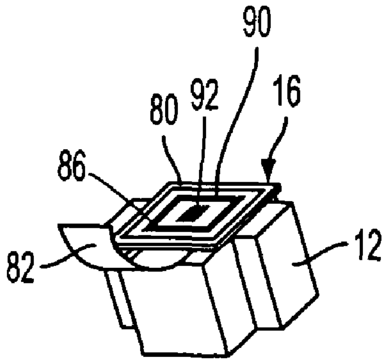
FIG. 4 is a perspective view of an ink stick having a flexible tab attached thereto, the radio frequency identification tag being attached to the flexible tab.
Figure 5:
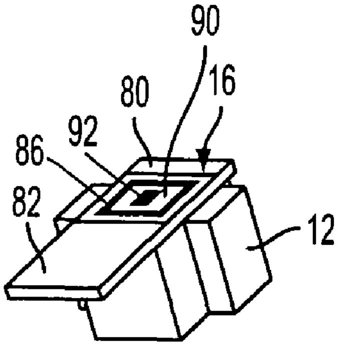
FIG. 5 is a perspective view of an ink stick having a rigid tab attached thereto, the radio frequency identification tag being attached to the rigid tab.

In FIG. 2, the CRUM 16 is depicted as a radio frequency identification (RFID) tag 90 attached to the ink stick 12. As shown in FIG. 4, the RFID tag 90 may be attached to a substrate 80, which is in turn attached to the ink stick 12. In the embodiment shown, the substrate 80 is attached to a surface of the ink stick (e.g., by use of an adhesive); it is also contemplated that the tag 90 may be fully or partially embedded in the ink stick 12. As shown in FIG. 4, the substrate 80 may include a tab 82, which protrudes from the ink stick 12. A person installing the ink stick 12 may grasp the tab 82 during insertion of the ink stick 12 into the machine 10. The tab 82 may be formed from a flexible material, as shown in FIG. 4, or may be formed from a rigid material, as shown in FIG. 5.

Figure 6:
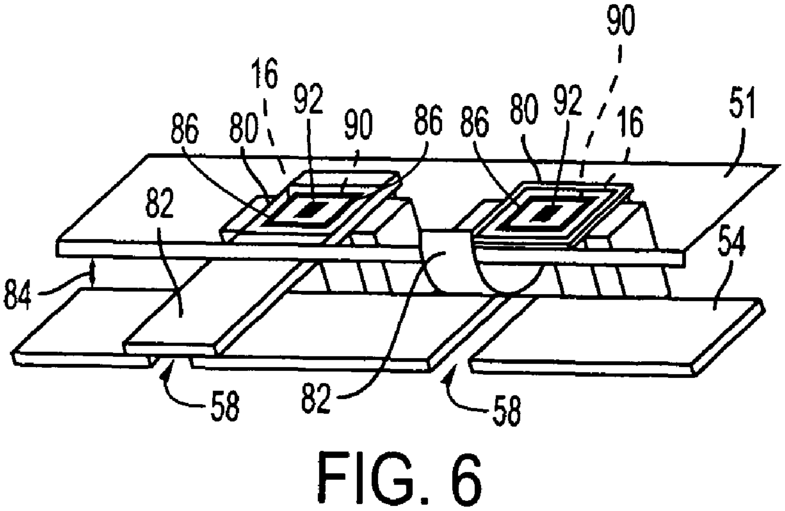
FIG. 6 is a partial top perspective view of the printing apparatus with an ink access cover as it is being closed over the ink sticks of FIG. 4 and FIG. 5.

Referring again to FIG. 2, with the ink stick 12 installed in the feed channel 58, the ink access cover 50 may then be moved toward the closed position, which causes the sliding cover 51 to pass over the ink sticks 12. Disposed on the sliding cover 51 are reader antennas 88A-D, each of which is associated with a feed channel 58A-D, respectively, and each of which is a component of the coupler 18 (FIG. 1). As the reader antennas 88 pass over the CRUMs 16, data is communicated between the CRUMs 16 and the coupler 18 via the reader antennas 88. As can be seen in FIG. 6, with the sliding cover 51 positioned over the CRUMs 16, the tabs 82 may protrude through a space 84 between the sliding cover 51 and the key plate 54, thus allowing the person installing the ink sticks to grasp the tabs 82 and remove the CRUMs 16 from the ink sticks 12. For purposes of simplicity, the reader antennas 88 are not shown in the view of FIG. 6.

Figure 7:
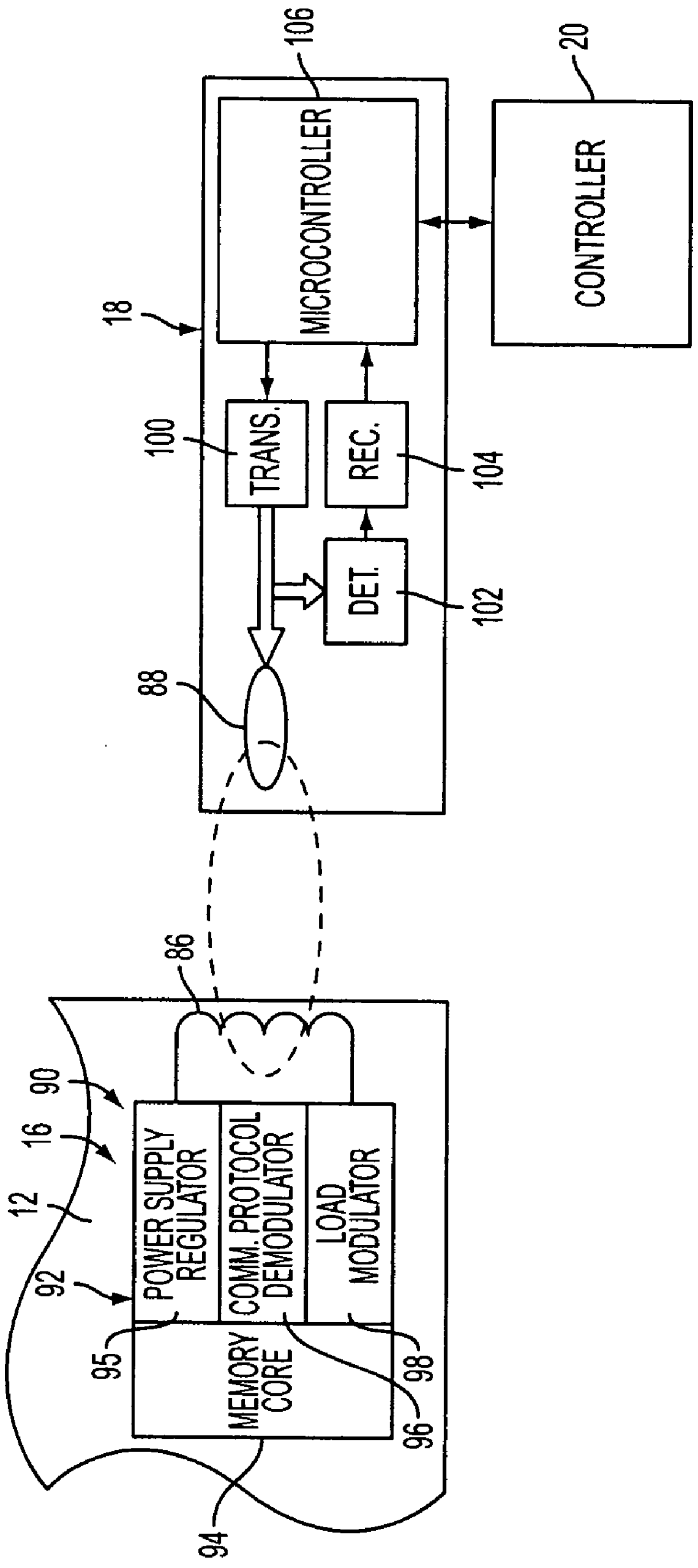
FIG. 7 is a simplified schematic view of a radio frequency identification tag associated with an ink stick and electromagnetically coupled to a reader in the printing apparatus.

FIG. 7 is a simplified schematic view of a CRUM 16 electromagnetically coupled to the coupler 18. In the embodiment shown, the CRUM 16 is in the form of a passive RFID tag 90 that communicates data by way of electric and/or magnetic field coupling between an antenna 86 forming part of the tag 90 and an antenna 88 on the coupler 18. The coupler 18 acts as an RFID reader (also known as an interrogator or transceiver).

Within tag 90, data storage and processing as well as radio frequency (RF) communications functions are typically performed by an integrated circuit chip 92, also known as a radio frequency identification chip. For example, the chip 92 may include: a memory core 94 (e.g., an EEPROM or flash memory), which stores the data associated with the CRUM 16; a power supply regulator 95, which rectifies and otherwise conditions alternating current induced in the antenna 86 by a time-varying RF signal provided by the antenna 88 on the coupler 18 for use in the tag 90 as a direct current power source; and receiver/emitter modules 96, 98 (e.g., compatible with the ISO 14443 standard) for demodulating and decoding incoming data from the received RF signal and superimposing outgoing data on the RF carrier signal by load variation, respectively.

The coupler 18 includes a transmitter 100 that generates the time-varying RF signal transmitted by the antenna 88. As a result of electromagnetic coupling between the tag antenna 86 and the coupler antenna 88, a portion of the RF signal transmitted by the tag antenna 86 enters the coupler antenna 88 and is separated from the transmitted signal by a detector 102 (e.g., an envelope detector). The separated signal is passed to a receiver 104, where it is amplified, decoded and presented via a microcontroller 106 to the controller 20.

The coupler antenna 88 may be sized and positioned within the machine 10 such that it communicates with one or more CRUMs 16. Where the printing apparatus uses more than one color ink stick 12 and, therefore, more than one feed channels 58A-D (FIG. 2), the coupler 18 may include one antenna 88 per channel, as depicted in FIG. 2. Alternatively, a single antenna 88 may be used to read the CRUMs 16 from all ink sticks 12 installed in the printing apparatus.

Where more than one ink stick 12 is read together in the same RF field, the coupler 18 and tags 90 may employ an anti-collision technique, which allows the coupler 18 to receive data from each tag 90 on a one-by-one basis. Any convenient anti-collision technique may be employed. For example, a so-called "gap pulse" technique may be used wherein, in response to the receiver 104 detecting signal collision from competing tags 90, the microcontroller 106 causes the transmitter 100 to transmit a gap pulse via antenna 88. When each tag 90 recognizes the gap pulse, it ceases further transmission of data until it counts a randomly generated number. Each tag 90 will finish counting the number in a different time and, as a result, will transmit its data at a different time.

Referring again to FIG. 1, there are many different types of data which could be stored in CRUM 16. In a broad sense, the CRUM 16 could retain an identifier (binary code) for the ink stick 12, such as a serial number, which can be used by the machine 10 to determine, for example, whether the particular installed ink stick 12 is compatible with the machine 10. For color machines having different feed channels for each color, the identification could be used by the machine 10 to determine if the ink stick 12 is installed in the correct channel (e.g., black ink sticks are installed in the black channel, cyan ink sticks are installed in the cyan channel, etc.). The controller 20 can output an error code to the user interface 40 if it is determined that an ink stick 12 has been incorrectly installed.

In addition, the data stored in the CRUM 16 may include one or more anti-arbitrage variables. As used herein, an "anti-arbitrage variable" is any data that can be used to identify a market in which the ink stick 12 is authorized by the manufacturer to be sold and/or used, or, conversely, any data that can be used to identify a market in which the ink stick is unauthorized for sale and/or use. Such data can be provided to the controller 20, via the coupler 18, which will prevent the use of an ink stick 12 if it is determined that the market in which the ink stick is intended for use does not match a market associated with the machine 10. Such data can also be read by a reader external to the machine 10 (e.g., during shipping or storage of the ink stick) to prevent the sale, resale, and/or use of the ink stick 12 in an unauthorized market. For example, the anti-arbitrage variables may include a market region code that identifies the market region, such as a geographical region, in which the ink stick 12 is authorized to be sold and/or used. In another example, the anti-arbitrage variables may include a field of use code that identifies a particular field of use arrangement existing between the manufacturer and the seller or user of the ink stick 12 that limits the sale or use of the ink stick 12. The field of use code may indicate, for example, that the ink stick 12 is to be sold only as part of a package or that the ink stick 12 is to be used only for certain machines.

In other types of CRUM systems, the CRUM 16 can maintain data related to use of the ink stick 12. For example, the CRUM 16 may include a print count indicating the number of prints which have been output using the particular ink stick 12. In another example, the CRUM 16 may include a pixel count that represents the total cumulative usage of the particular ink stick 12 in terms of the number of pixels which have been printed using the ink stick 12. Of course, in a color-capable printing apparatus, the pixel usage would be determined with respect to each different color pixel generated by the machine 10. U.S. Pat. No. 5,636,032, incorporated by reference herein, gives a general teaching of pixel-counting techniques useful for determining a consumption rate of marking material. Other data related to the use of the ink stick 12 may be related to a temperature of the melt plate 60 (FIG. 3) and/or a duration which the melt plate 60 is energized to melt the ink stick 12.

The CRUM 16 may also include data indicating a maximum use value. The maximum use value is a value, typically entered into a predetermined location in the CRUM memory at manufacture of the ink stick, which indicates the maximum usage (e.g., maximum number of prints or maximum number of pixels) for which the particular ink stick is designed to output before replacement. This maximum use value will of course be compared with the current print count or pixel count, and when the print or pixel count reaches a certain range relative to the maximum value, the controller 20 can display a particular message on the user interface 40 and/or place a "reorder" notice over the network or phone line to the manufacturer or supplier, indicating that ink sticks 12 will soon need to be installed and/or ordered.

Another type of data which may be stored in a particular location in the non-volatile memory of the CRUM 16 may relate to specific performance data associated with the ink stick 12, so that the ink stick 12 can be used in an optimal, or at least advisable, manner. For instance, in the ink jet context, it is known to load data symbolic of optimal voltage or pulse width in the CRUM 16, so that the printhead 30 may be optimally operated when the ink stick 12 is installed. In another example, the CRUM 16 may include data relating to temperatures at which the melt plate 60 (FIG. 3) is to be heated for melting the ink stick 12. Again, there may be provided any number of spaces in the CRUM 16 memory for retaining information relating to different performance data.

Figure 8:
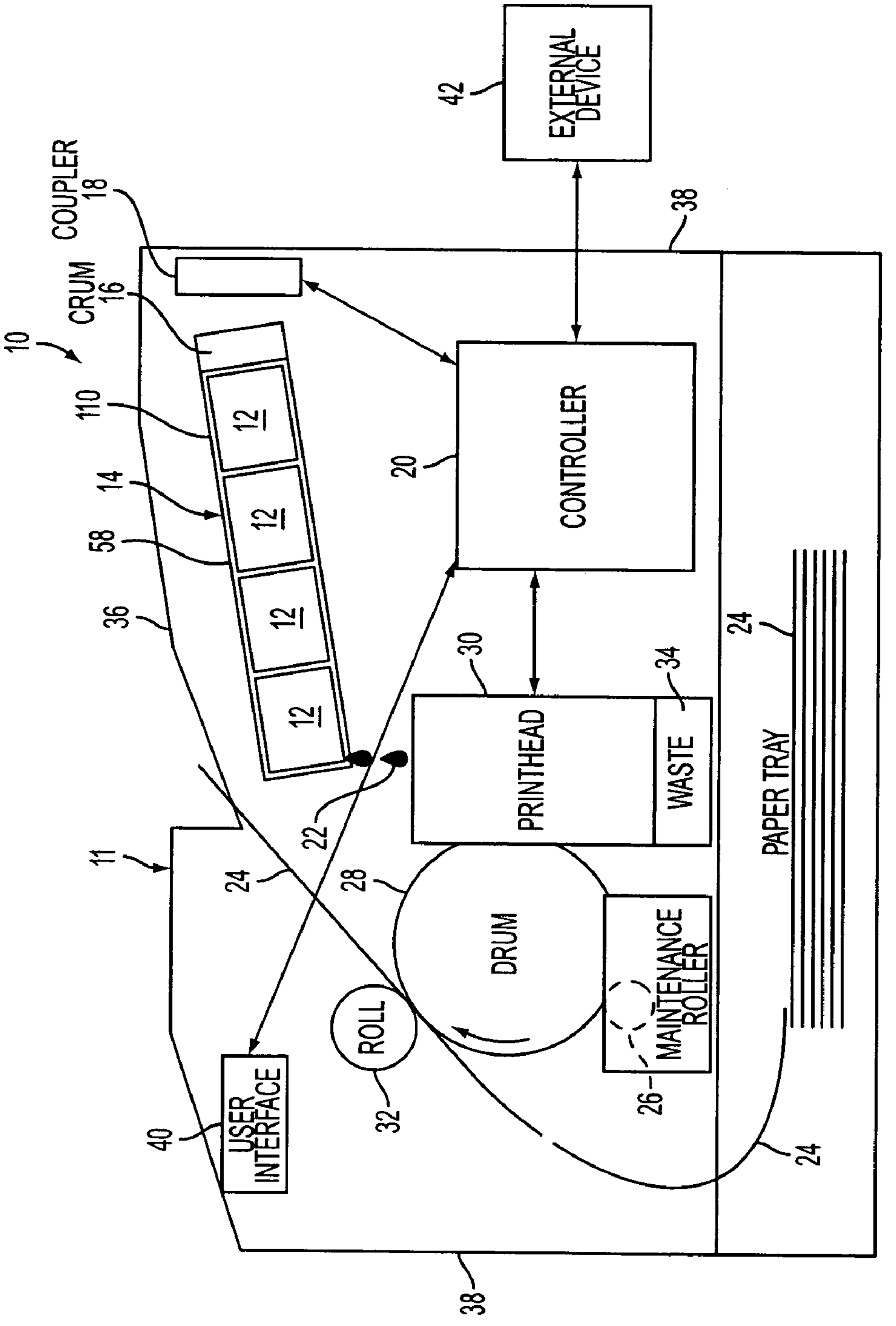
FIG. 8 is a schematic elevation view of a printing apparatus including ink sticks disposed in a cartridge, where the cartridge includes an electronically-readable memory device attached thereto.

Referring to FIG. 8, an embodiment is shown in which the CRUM 16 is attached to a removable cartridge 110 in which the ink sticks 12 are disposed. The cartridge 110 forms a single feed channel 58, which allows multiple ink sticks 12 to be installed at the same time. When the cartridge 110 is installed in the machine 10, the coupler 18 detects the presence of the CRUM 16 and communicates data between the CRUM 16 and the controller 18. As previously discussed, the data may include identification data, anti-arbitrage variables, usage data, maximum use values, and performance data related to the ink sticks 12 in the cartridge 110.

Figure 9:
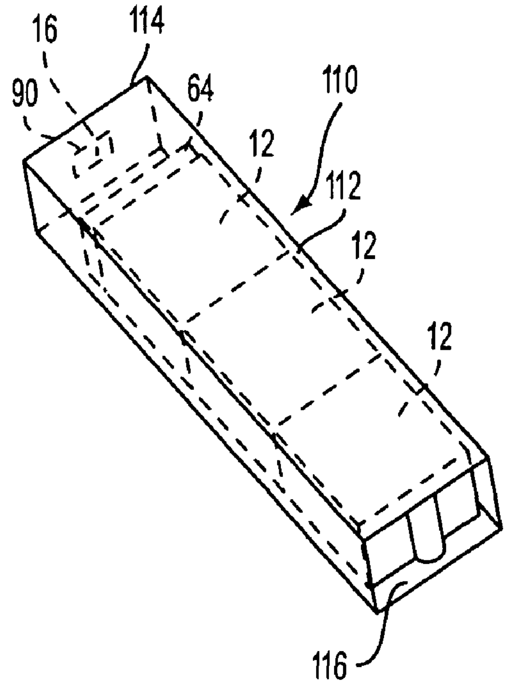
FIG. 9 is a perspective view of the cartridge shown in FIG. 8.
Figure 10:
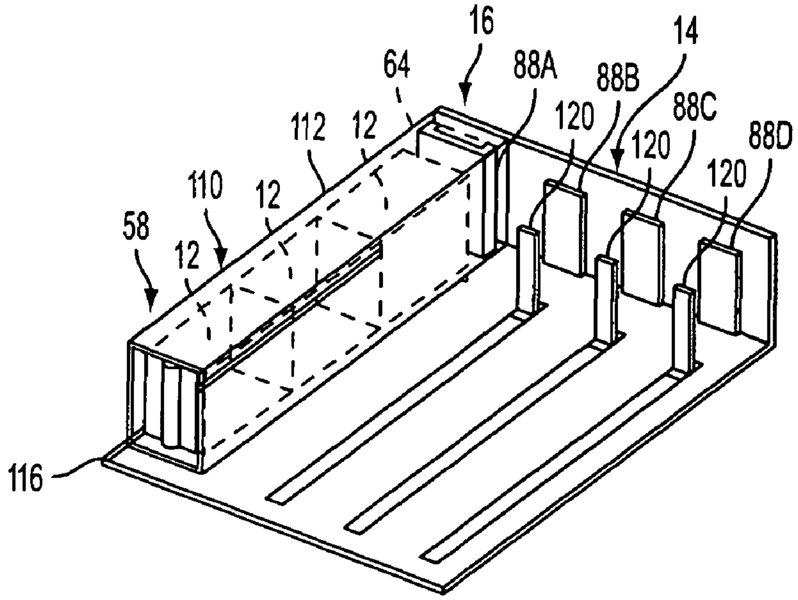
FIG. 10 is a perspective view of part of the printing apparatus with the cartridge of FIG. 9 installed therein.

FIG. 9 is a perspective view of the cartridge 110 with ink sticks 12 disposed therein. The cartridge 110 includes a housing 112, which may be formed as a hollow, generally prismatic structure having one closed end 114 and one open end 116. The housing 112 may be formed from a rigid material (e.g., plastic), and may be transparent to allow for viewing of the ink sticks 12 within. In the embodiment shown, the push block 64 is disposed within the cartridge 110. The push block 64 may be driven by a driving force or element, such as a constant force spring (not shown) disposed in the cartridge 110, to push the individual ink sticks 12 along the length of the housing 112 toward the melt plate 60 (FIG. 3). In lieu of a constant force spring, gravity may be used to move the ink sticks 12 along the length of the housing 112, or the push block 64 may be coupled to a driving mechanism external to the housing 112. For example, FIG. 10 depicts a cartridge 110 installed in a feed system 14, where the feed system 14 includes posts 120 extending upwards therefrom. When the cartridge 110 is installed, a post 120 is received through a slot in the bottom of the housing 112 to allow the post 120 to engage the pusher block 64. During operation, the post drives the pusher block 64 to push the ink sticks 12 along the length of the housing 112 toward the melt plate 60 (FIG. 3). As can be seen in FIG. 10, the reader antenna 88A-D for each of the feed channels 58 may be positioned proximate the CRUM 16.

The cartridge 110 may be removed and refilled when the ink sticks 12 are exhausted. It is contemplated that the cartridges 110 may be the same for each color ink stick 12, thus allowing re-use of the cartridges 110 for any color ink stick 12. As part of the refilling process, the CRUM 16 would be programmed to indicate the color of ink stick used in refilling the cartridge 110. Other data, such as identification data and anti-arbitrage variables, can be written to the CRUM 16 during the refilling process. This data can be subsequently used by the machine 10 to ensure that the cartridge 110 was refilled in an authorized manner. Also, data written to the CRUM 16 by the machine 10 can be read by service technicians during the refilling process. Such data may be useful in troubleshooting a problem with a machine, cartridge, or ink stick, and it may be useful in tracking the use of the cartridge 110 (e.g., number of prints made, number of refills, machines in which it was used, etc.). U.S. Pat. No. 6,016,409 entitled "System For Managing User Modules in a Digital Printing Apparatus", which is incorporated by reference herein in its entirety, describes various data that may be stored in a CRUM and various functions that may be performed using this data.

Figure 11:
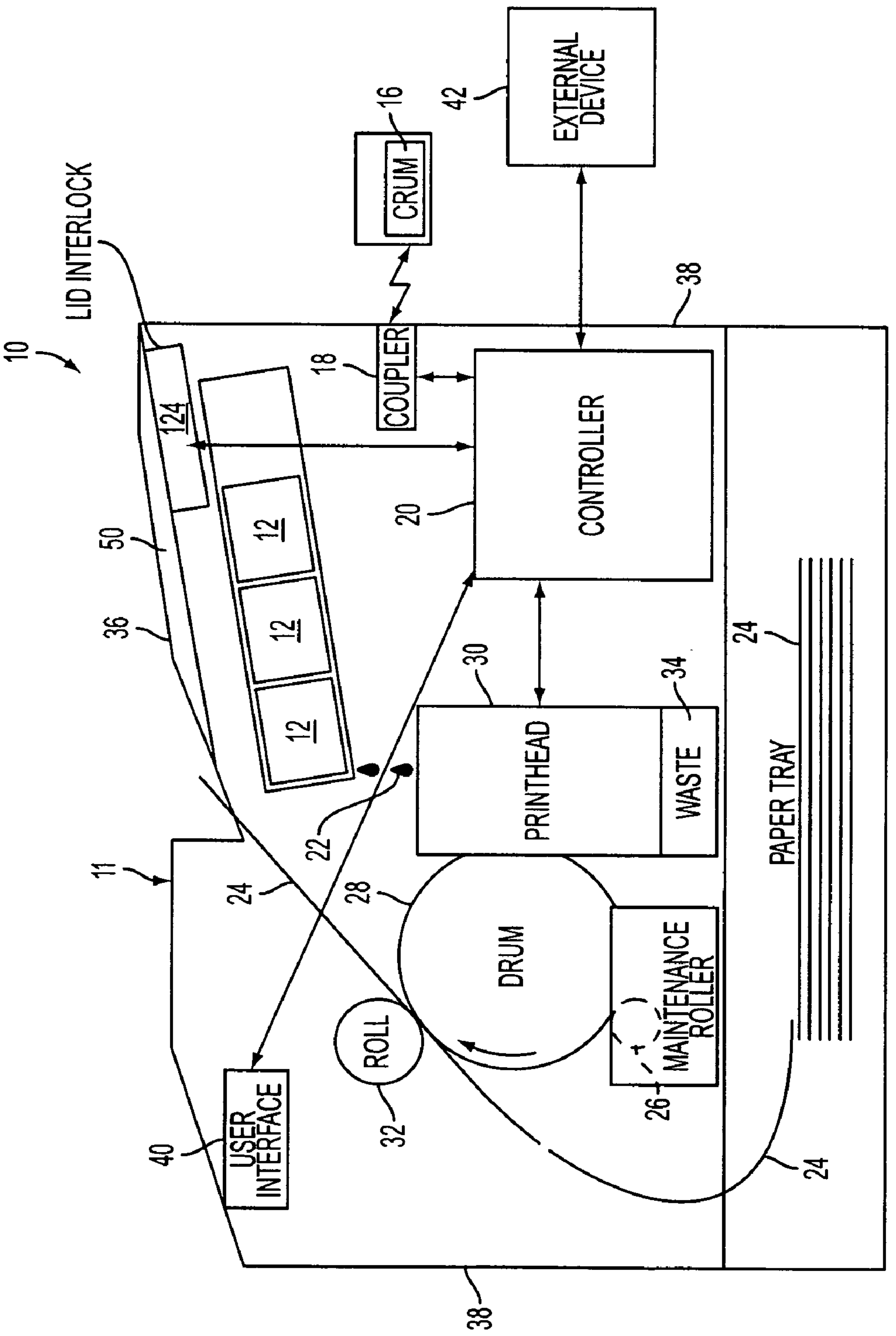
FIG. 11 is a schematic elevation view of a printing apparatus including a coupler for reading electronic data associated with an electronically-readable memory device positioned external to the printing apparatus.

Referring to FIG. 11, an embodiment is shown in which the printing apparatus 10 includes a coupler board 18 configured to read electronic data from the CRUM 16 while the CRUM 16 is positioned external to the printing apparatus 10 (i.e., outside the outer housing 11). In this embodiment, the CRUM 16 may be attached to any structure associated with the marking material. For example, the CRUM 16 may be attached to an ink stick (e.g., as described above with reference to FIGS. 5 and 6), the CRUM 16 may be attached to a cartridge including one or more ink sticks (e.g., as described above with reference to FIGS. 8 and 9) or including any other form of marking material (e.g., powdered toner, liquid ink, etc.), or the CRUM 16 may be attached to another form of container, such as a box.

Before installing new marking material (e.g., a new ink stick), the CRUM 16 associated with the marking material is placed within the range of the coupler 18. The coupler 18 detects the presence of the CRUM 16 and communicates data between the CRUM 16 and the controller 18. As previously discussed, the data may include identification data, anti-arbitrage variables, usage data, maximum use values, and performance data related to the ink sticks 12 in the cartridge 110. For example, the controller 18 may run an authentication algorithm to validate the suitability of the marking material for use in the machine 10. Such an algorithm may include, for example, checking for authenticity, geographic region, performance data, and the like. If the marking material is determined by the controller 20 to be unsuitable for the machine, the controller 20 may: provide a warning signal via user interface 40, prevent operation of the machine 10, eliminate operating features of the machine 10, and/or activate a lid interlock 124 (FIG. 11) to prevent opening of the access cover 50 and, thus, preventing installation of the marking material. If the marking material is determined by the controller 20 to be suitable for the machine 10, the controller 20 (via coupler 18) may disable the CRUM 16 from further use by writing data to, or erasing data from, the CRUM 16.

Figure 12:
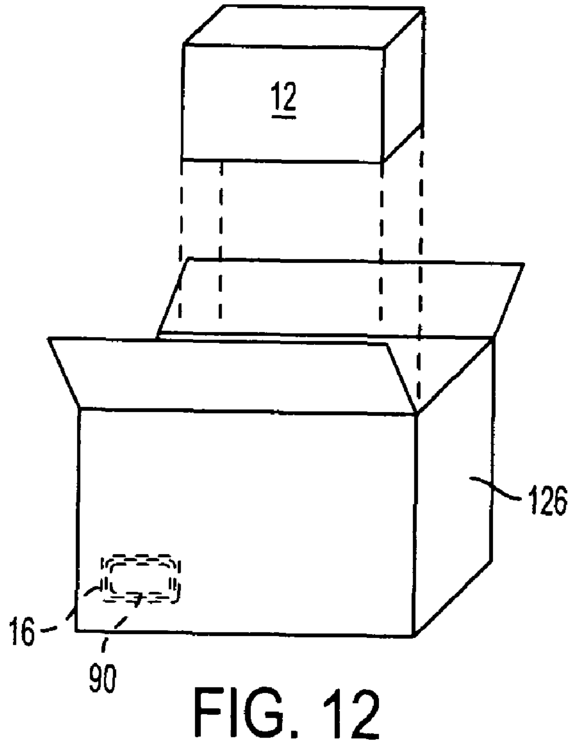
FIG. 12 is a perspective view of an electronically-readable memory device attached to a package.

FIG. 12 depicts an embodiment wherein a CRUM 16 including an RFID tag 90 is attached to a container 126, which receives the marking material (e.g., ink stick 12). The CRUM 16 may be printed, adhered, imbedded or otherwise attached to the container 126. For example, the CRUM 16 may be part of a label secured to the container 126. The container 126 may include anything in which the marking material is packed for storage or transportation. While FIG. 12 depicts the container 126 as a box, it is contemplated that the container 126 may include anyone or more of: an envelope, a wrapper, a pallet, a carton, a can, ajar, a tray, a trunk, a sleeve, a cargo container, and the like.

Figure 13:
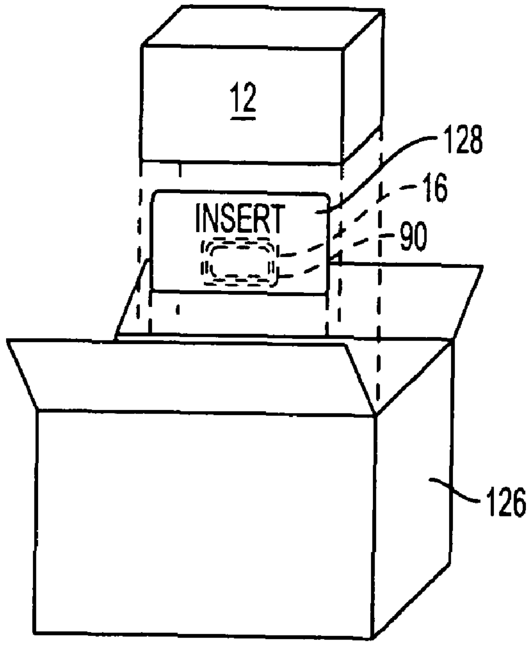
FIG. 13 is a perspective view of an electronically-readable memory device disposed in the package.

FIG. 13 depicts an embodiment in which the CRUM 16 is attached to an object 128 that is inserted in the package 126. For example, the object 128 may be part of a card, packing material, wrapping, etc that is inserted in the package 126.

Although the printing machines disclosed hereinabove and shown particularly in FIGS. 1-3 and 8-11 include a feed system, generally shown at 14, which dispenses ink from supply units, such as ink sticks, sequentially one at a time from a multiple supply comprising a serial stack or row of ink stick, for example, it is of course possible to dispense ink from supply units two or more at a time or in parallel relation using a feed system comprising multiple feed channels. The multiple feed channels dispense marking material of the same type or color simultaneously from at least a first and second supply unit in a manner similar to that shown and described in the Palumbo et al patent, supra. The first and second supply units each contain a quantity of marking material and have a memory device associated therewith. The feed system enables the supply units to dispense marking material at the same time or in parallel arrangement together with a coupler capable of communicating with the memory device of each supply unit or ink stick. With this type of arrangement, it is possible for one of the supply units to be dispensing printing material while the other supply unit is nearly spent of all its content, enabling continuous operation of the printing apparatus.

Such an arrangement may be exemplified by reference to FIG. 2, wherein at least the first two keyed openings 56A and 56B in feed channels 58A and 58B have installed therein a first and second module or ink stick 70, both of the same color. The ink stick 70 in the first keyed opening 58A is the first to be melted and fed to the printhead 30 while the second ink stick 70 in the keyed opening 56B is held in reserve. When the first ink stick 70 is almost or nearly spent, the second ink stick 70 is melted and fed to the printheat 30 via the feed channel 58B without interrupting the continuous flow of ink. In the meantime, a new or third ink stick 70 of the same color is placed in the keyed opening 56A for melting and feeding to the printhead 30 when the second ink stick 70 is also nearly spent. Thus, the spent or used ink sticks are replaced without stopping the machine 10.

It should be understood that any of the features, characteristics, alternatives or modifications described regarding a particular embodiment herein may also be applied, used, or incorporated with any other embodiment described herein.

A number of embodiments have been described. Nevertheless, it will be understood that various modifications may be made without departing from the spirit and scope of the invention. Accordingly, other embodiments are within the scope of the following claims.

What is claimed is:

1. An ink stick suitable for installation in a machine, the ink stick having an electronically-readable memory device associated therewith, said memory device having stored therein electronic data related to said ink stick and readable by said machine, said machine having a plurality of reading devices and a plurality of corresponding ink stick feed channels, each reading device corresponding to a separate feed channel, wherein said memory device is attached to said ink stick before installation in said machine, said memory device is proximate to and communicates with only one of said plurality of reading devices upon installation of said ink stick in the corresponding feed channel, and said ink stick is configured to be at least partially consumed in the machine.

2. The ink stick of claim 1, wherein said memory device is detachable from said ink stick before installation of said ink stick into said machine.

3. The ink stick of claim 1, wherein said memory device is configured to be detached from said ink stick before said ink stick is used in said machine.

4. The ink stick of claim 3, wherein said memory device is disposed on a substrate, said substrate including a tab for removing said memory device from said ink stick.

5. The ink stick of claim 1, wherein said memory device is attached to a container configured to receive said ink stick.

6. The ink stick of claim 1, wherein said memory device is disposed on or in a container configured to receive said ink stick.

7. The ink stick of claim 1, wherein said electronic data is selected from the group of identification data, anti-arbitrage variables, usage data, maximum use values, and performance data related to said ink stick.

8. The ink stick of claim 1, wherein said memory device is a component of a radio frequency identification tag.

9. The ink stick of claim 1, wherein said machine is a printing apparatus.

10. An ink stick suitable for installation in a machine, the ink stick having an electronically-readable memory device associated therewith, said memory device having stored therein electronic data related to said ink stick and readable by said machine, wherein said memory device is attached to said ink stick before installation in said machine, said memory device is configured to be detached from said ink stick before said ink stick is used in said machine, said memory device is disposed on a substrate, said substrate including a tab for removing said memory device from ink stick, and said ink stick is configured to be at least partially consumed in the machine.

11. The ink stick of claim 10, wherein said memory device is attached to a container configured to receive said ink stick.

12. The ink stick of claim 10, wherein said memory device is disposed on or in a container configured to receive said ink stick.

13. The ink stick of claim 10, wherein said electronic data is selected from the group of identification data, anti-arbitrage variables, usage data, maximum use values, and performance data related to said ink stick.

14. The ink stick of claim 10, wherein said memory device is a component of a radio frequency identification tag.

15. The ink stick of claim 10, wherein said machine is a printing apparatus.

16. The ink stick of claim 10, wherein said tab protrudes from the ink stick, thereby facilitating removal of the memory device from the ink stick after installation of the ink stick in said machine.

17. The ink stick of claim 16, wherein said tab is formed from a flexible material.

18. The ink stick of claim 16, wherein said tab is formed from a rigid material.

* * * * *